United States Patent [19]

Carter et al.

[11] 4,346,370
[45] Aug. 24, 1982

[54] ULTRA-SONIC PEST CONTROL APPARATUS

[76] Inventors: Harry D. Carter, 5108 FM 1960 West, Houston, Tex. 77069; Ted Ojevich, 5935 Moonmist, Houston, Tex. 77081

[21] Appl. No.: 162,763

[22] Filed: Jun. 25, 1980

[51] Int. Cl.³ .................... G08B 3/10; A01M 29/00
[52] U.S. Cl. .................... 340/384 E; 340/384 R
[58] Field of Search .................... 340/384 E, 384 R

[56] References Cited

U.S. PATENT DOCUMENTS

| | | | |
|---|---|---|---|
| 3,058,103 | 10/1962 | Evans | 340/384 |
| 3,138,138 | 6/1964 | Quittner | 116/137 |
| 3,503,039 | 3/1970 | Aniskovicz | 340/15 |
| 3,636,559 | 1/1972 | Del Grande et al. | 340/384 |
| 3,838,418 | 9/1974 | Brown | 340/384 E |
| 3,872,472 | 3/1975 | Moschgat | 340/384 E |
| 3,873,960 | 3/1975 | Gates, Sr. | 340/15 |
| 3,879,702 | 4/1975 | Mancone | 340/15 |
| 3,886,492 | 5/1975 | White | 340/15 |
| 3,891,962 | 6/1975 | White | 340/15 |
| 4,178,578 | 12/1979 | Hall | 367/139 |
| 4,186,387 | 10/1977 | Moschgat | 340/384 E |

*Primary Examiner*—John W. Caldwell, Sr.
*Assistant Examiner*—Daniel Myer
*Attorney, Agent, or Firm*—Pravel, Gambrell, Hewitt, Kirk & Kimball

[57] ABSTRACT

An ultra-sonic pest control apparatus includes a tone generator for generating an output frequency as a function of applied voltage, a transducer electrically connected to the output of the tone generator for delivering ultra-sonic sound, and a generator for generating a periodically repeating sawtooth waveform. A gating oscillator connected to the tone generator and generator emits a frequency sweep responsive to each sawtooth pattern of the sawtooth waveforms and uniformly chops a portion of each frequency sweep and passes the chopped frequency sweeps at predetermined, uniform, timed intervals to the transducer.

6 Claims, 2 Drawing Figures

ULTRA-SONIC PEST CONTROL APPARATUS

BACKGROUND OF THE INVENTION

This invention relates to apparatuses for controlling pests such as insects and rodents and, more particularly, to such apparatuses which operate to repel pests by generating ultra-sonic sound at frequency levels which cannot be tolerated by the pests.

It is known that pests can be controlled by using ultra-sonic means for producing sound waves at levels which cannot be heard by humans, but which is repugnant to the sound detection systems of insects and rodents. One early example of such a device is shown in U.S. Pat. No. 3,138,138.

Many different devices have been developed which use different types of ultra-sonic wave forms and equipment for generating the sound. For example, randomly varying signals are generated in devices taught by U.S. Pat. Nos. 4,186,387, 3,872,472 and 3,636,559 and an alternating signal in U.S. Pat. No. 3,058,103. Unijunction transistors are used in U.S. Pat. Nos. 3,891,962 and 3,886,492 for continuously varying frequencies produced from an output signal with a sawtooth wave form. Multiple frequencies are used simultaneously in U.S. Pat. Nos. 4,178,578 and 3,503,039. A plurality of speakers are used in U.S. Pat. No. 3,873,960 and a specific disk reflector is taught in U.S. Pat. No. 3,879,702.

An improvement over the above-mentioned U.S. Pat. No. 3,636,559 is taught in U.S. Pat. No. 3,838,418 where instead of randomly modulating the swept signal taught in that former patent, the signal is broken into periodically repeating sawtooth ramps with sloping amplitudes and contiguous alternate segments with constant amplitudes so that successive tone generator outputs are broken by a silent period and have continuously changing frequencies.

SUMMARY OF THE INVENTION

A pest control apparatus has been developed in accordance with the invention which utilizes a sweeping frequency, but produces an ultra-sonic sound formed of uniform chopped frequency sweeps at uniform timed intervals. It is believed that this type of sound is effective in repelling rodents, insects or both depending on the range through which the frequency is swept. Instead of generating random or different frequencies in a pattern with interspersed rest periods, the frequency is swept through the same range each time a signal is produced with uniform silent periods between sweeps. It is believed that this type of signal is novel and is one to which pests will not become acclimated. The sweep through a relatively wide frequency range repels a wide variety of pests which are sensitive to different frequencies.

The apparatus which produces this novel signal includes a tone generator which generates an output frequency as a function of applied voltage. A speaker or transducer is connected to the output of the tone generator for producing the ultra-sonic sound. A generating means provides a periodically repeating sawtooth wave form. A gating means is connected to the tone generator and the generating means for producing a frequency sweep response to each sawtooth pattern of the sawtooth wave form, the swept frequency normally being capable of producing a signal which ranges from sub-audible to about 30 megahertz.

The gating means operates to uniformly chop portions of each frequency sweep so that the resulting signal is from between 19–60 kilohertz. The chopped portion is then passed at predetermined, uniform, timed intervals through a driver to the speaker. It is contemplated that each frequency sweep lasts for about 8 seconds with an 8 second quiet interval between sweeps.

Thus, intermittent sound is produced through a frequency range which cannot be tolerated by a large number of pests ranging from insects to rodents for repelling the pests and providing a sound barrier against their return. The intermittent signal which sweeps through a relatively wide frequency range also produces enough variety in the produced sound so that pests will not develop a resistance to the sound and render the device ineffective.

BRIEF DESCRIPTION OF THE DRAWINGS

A better understanding of the invention can be obtained when the detailed description of a preferred embodiment set forth below is considered in conjunction with the drawings, in which.

DETAILED DESCRIPTION OF A PREFERRED EMBODIMENT

Figure 1:
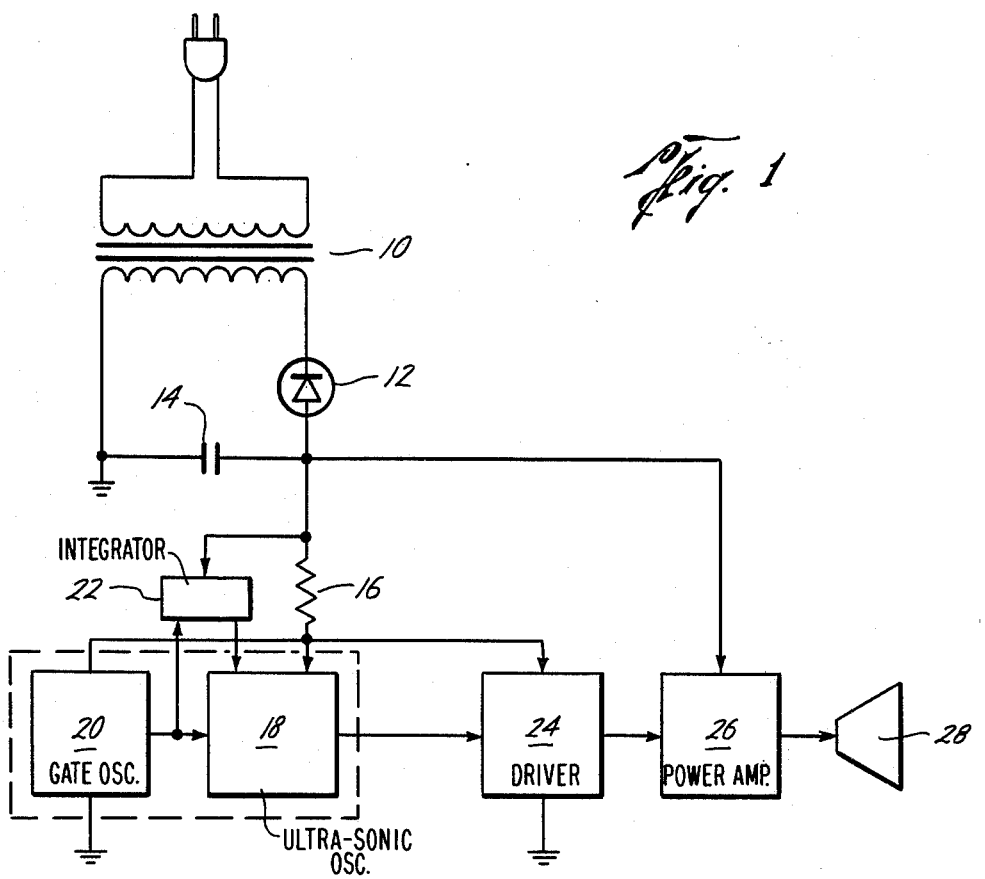
FIG. 1 is a schematic illustration of the components of the inventive pest control apparatus.

A schematic diagram of the apparatus for producing the novel signal which is the subject of the instant invention is shown in FIG. 1 where alternating current (a.c.) from a standard source (not shown) is conducted through a transformer 10 to a rectifier 12 where the a.c. is rectified or converted to 28 volt direct current (d.c.). A capacitor 14 acts as a smoothing filter for evening out current flow.

The direct current is transmitted through a 180 ohm resistor 16 for dropping the current to 5 volts and transmitting it to an ultra-sound oscillator 18. The oscillator 18 is a monostable, multi-vibrator voltage controlled oscillator which is capable of generating a 19–60 kilohertz signal. A gating oscillator 20 is provided and operates to turn the ultra-sound oscillator 18 on and off.

Figure 2:
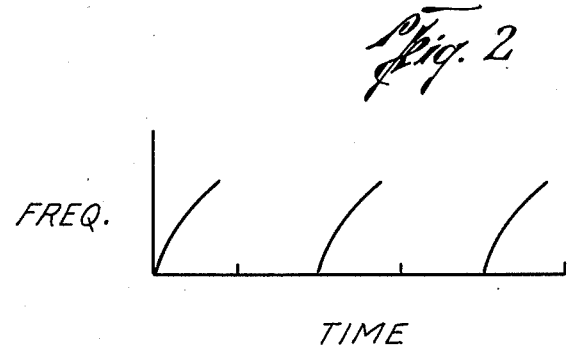
FIG. 2 is a frequency/time graph which shows the signal produced by the apparatus of FIG. 1.

As shown in FIG. 1, a gating signal produced by the gating oscillator 20 is fed both to the ultra-sound oscillator 18 and to an integrator 22 which produces a sawtooth output which is fed to a voltage controlled input of the ultra-sound oscillator 18 for producing a frequency sweep during the time that the integrator 22 is turned on by the gating oscillator 20. The effect of the sawtooth output transmitted from the integrator 22 to the ultra-sound oscillator 18 is to produce a signal of the type which is shown in FIG. 2, which is a graph which plots frequency versus time. The curve which is shown in FIG. 2 represents only a portion of the overall frequency sweep across the entire 28 volt capacity of the circuit. The range of the curve can be regulated by a standard capacitor-resistor regulating device so that only the most desirable portion of the frequency sweep such as, for example, the portion from about 0–4 volts is produced.

The gating oscillator 20 operates to provide the desired sweep which is preferably through an 8 second interval and then provides a silent period throughout another 8 second interval between frequency sweeps. This is represented by the gap between adjacent curves in FIG. 2. The ultra-sound oscillator 18 is capable of producing a frequency sweep in the range from subaudible to about 30 megahertz and the effect of the sawtooth output of the integrator produces a frequency shift of the ultra-sound oscillator within the desired frequency range.

The ultra-sound oscillator 18 and gating oscillator 20 can be formed in a single-integrated circuit. One such circuit which is commercially available is produced by Texas Instrument Company and designated TI 74LS124 and is indicated schematically by the broken lines in FIG. 1.

The output signal from the ultra-sound oscillator 18 is transmitted to a driver 24 which serves as a buffer and amplifies the signal which is then transmitted to a power amplifier 26 and then to a transducer or speaker 28. The integrator 22 and driver 24 can be formed as a composite integrated-circuit. Such a circuit is manufactured by the Texas Instrument Company and designated as TI 7406, which has six inverters, one which is used for the integrator 22 and five for the driver 24. The integrated circuit TI 7406 is known as an open collector hex-inverter.

The power amplifier includes a pair of discrete transistors, model Nos. 2N4920 and 2N4923, both of which are available from the Texas Instrument Company. The speaker is preferably one produced by the Motorola Company, model No. KSN6001A or KSN6005A 3.5 inch Super Horn.

The integrated circuit designated as TI 7406 transforms a standard sawtooth signal by inverting it and transmitting it such that when the signal is on the low portion of the sawtooth pattern, the capacitance changes through a transistor and no signal is produced, but during the high point of the signal the output of the inverter is relatively low because of the short output of the capacitor so that the signal is interrupted depending on the setting of the inverter. Thus, a setting can be maintained so that the frequency will be swept from 0 to about 3 or 4 volts instead of throughout the entire 28 volt range for maintaining the signal within the frequencies most effective for repelling pests. This frequency range is adjustable by varying the capacitor.

Thus, an improved pest controller with a novel signal has been described which is believed effective for repelling most known pests through an intermittent generation of ultra-sonic sound. The device is made up of integrated circuits which can easily and quickly be assembled in a relatively small compact unit. The signal which is generated sweeps through a frequency range which cannot be tolerated by a wide variety of pests ranging from insects to rodents. By providing sweeping uniform signals as described and shown in FIG. 2 at intermittent intervals with a rest period in between successive signals, a sound is produced to which the pests will not become accustomed.

It should be understood that the detailed embodiment of the invention described above is intended to be merely exemplary and that one with ordinary skill in the art will be able to make modifications, changes and improvements to the invention without departing from the spirit of the invention and that all such changes, modifications and improvements are intended to fall within the scope of the appended claims.

We claim:
1. Ultra-sonic pest control apparatus, comprising:
   (a) tone generating means for generating an output frequency as a function of applied voltage;
   (b) a transducer electrically connected to the output of the tone generating means for delivering ultra-sonic sound;
   (c) generating means for generating a periodically repeating sawtooth waveform; and
   (d) gating means connected to the tone generating means and generating means for emitting a frequency sweep responsive to each sawtooth pattern of said sawtooth waveforms and uniformly chopping a portion of each frequency sweep and passing said chopped frequency sweeps at predetermined, uniform, timed intervals to said transducer.
2. Apparatus of claim 1, wherein the generating means includes means for inverting the sawtooth signal and means for changing capacitance for varying the frequency range of the signal.
3. Apparatus of claim 1, including means for sweeping the frequency through 19-60 kilohertz.
4. Apparatus of claim 1, wherein the tone generating means includes an ultra-sonic oscillator.
5. Apparatus of claim 1, wherein the gating means includes a gating oscillator.
6. Apparatus of claim 1, wherein the signal from the tone generating means is transmitted through a driver and power amplifier before being transmitted to the transducer.

* * * * *